April 10, 1951

T. R. SMITH 2,548,325

SELF-BASTING OVEN

Filed March 11, 1947

INVENTOR.
Thomas R. Smith
BY
Carl F. Rippert
Atty.

Patented Apr. 10, 1951

2,548,325

UNITED STATES PATENT OFFICE 2,548,325

SELF-BASTING OVEN

Thomas R. Smith, Newton, Iowa, assignor to The Maytag Company, Newton, Iowa, a corporation of Delaware Application March 11, 1947, Serial No. 733,822

10 Claims. (Cl. 99—347)

1

The present invention relates to an improved oven construction for use in a stove or range heated by any suitable source of heat and especially to a novel self-basting attachment or construction adapted to be embodied in the oven of such a stove or range.

In the various conventional types of gas or electric stoves or ranges now in use, provision is made for effectively insulating the oven to prevent heat supplied to the oven from being dissipated to the other parts of the stove or range and into the kitchen. Although such insulation results in greater efficiency, the high temperatures encountered in the oven prevent the formation and collection of any condensation of vapors issuing from a roast and the drippings which may be used for self-basting, and they are driven through the oven vent and condense and give off their heat of vaporization outside the oven.

In the operation of portable electric roasters of the type now on the market, the heat is brought into the oven through the bottom and sides while the top comprises a removable relatively thin cover generally formed of stainless steel, aluminum, or the like. Because of the exposure of the cover to the atmosphere and the rapid dissipation of heat therefrom, this cover is maintained at a sufficiently low temperature to condense the vapors emanating from a roast and cause them to drip back over and baste the roast. To facilitate such basting, the underside of the roaster cover may be provided with drip points.

In this invention, by providing a heat exchange surface in the interior of an oven which is maintained at a temperature below the normal operating temperature of the oven by means of a heat exchange fluid and arranged in such a manner that the vapors evaporated from a roast and the drippings contact and are condensed thereby, the heat of vaporization of the liquid is removed to the outside of the oven by the heat exchange fluid and the condensed vapors are caused to baste the roast from which they were evaporated. By condensing these vapors within the oven in this manner, there is only a small loss of heating efficiency in the oven and the exterior thereof is heated only slightly more than normal.

It is, therefore, an important object of the present invention to provide a novel self-basting device so constructed, arranged and designed that when embodied or incorporated in an oven of a conventional stove or range, automatically condenses a substantial portion of the vapors emanating from the roast and returns this condensate for self-basting the roast.

2

The invention further comprehends the incorporation in an oven of a stove or range, a novel construction and arrangement of heat transfer device whereby the heat of vaporization is removed from the vapors given off by the roast thereby causing such vapors to condense and drip back onto the roast for self-basting.

Another object of the present invention is the provision of a novel self-basting oven construction that involves only a small loss in heating efficiency and results in automatically condensing the vapors emanating from a roast, returning the condensate and causing it to uniformly drip back upon and baste the roast.

It is still another object of the invention to provide heat exchange means for a self-basting oven construction which may be put into or out of operation at will.

It is yet another object of the invention to provide a heat exchange means for a self-basting oven construction in which the quantity of fluid circulated in the heat exchange apparatus may be varied.

The invention further resides in the construction, combination and arrangement of parts illustrated in the accompanying drawing, and while there is shown therein a preferred embodiment, it is to be understood that the same is susceptible of modification and change, and comprehends other details, arrangement of parts, features and constructions without departing from the spirit of the invention.

These and further objects are effected by the invention as will be apparent from the following description and claims taken in connection with the accompanying drawing forming a part of this application, in which:

Figures 1, 2:
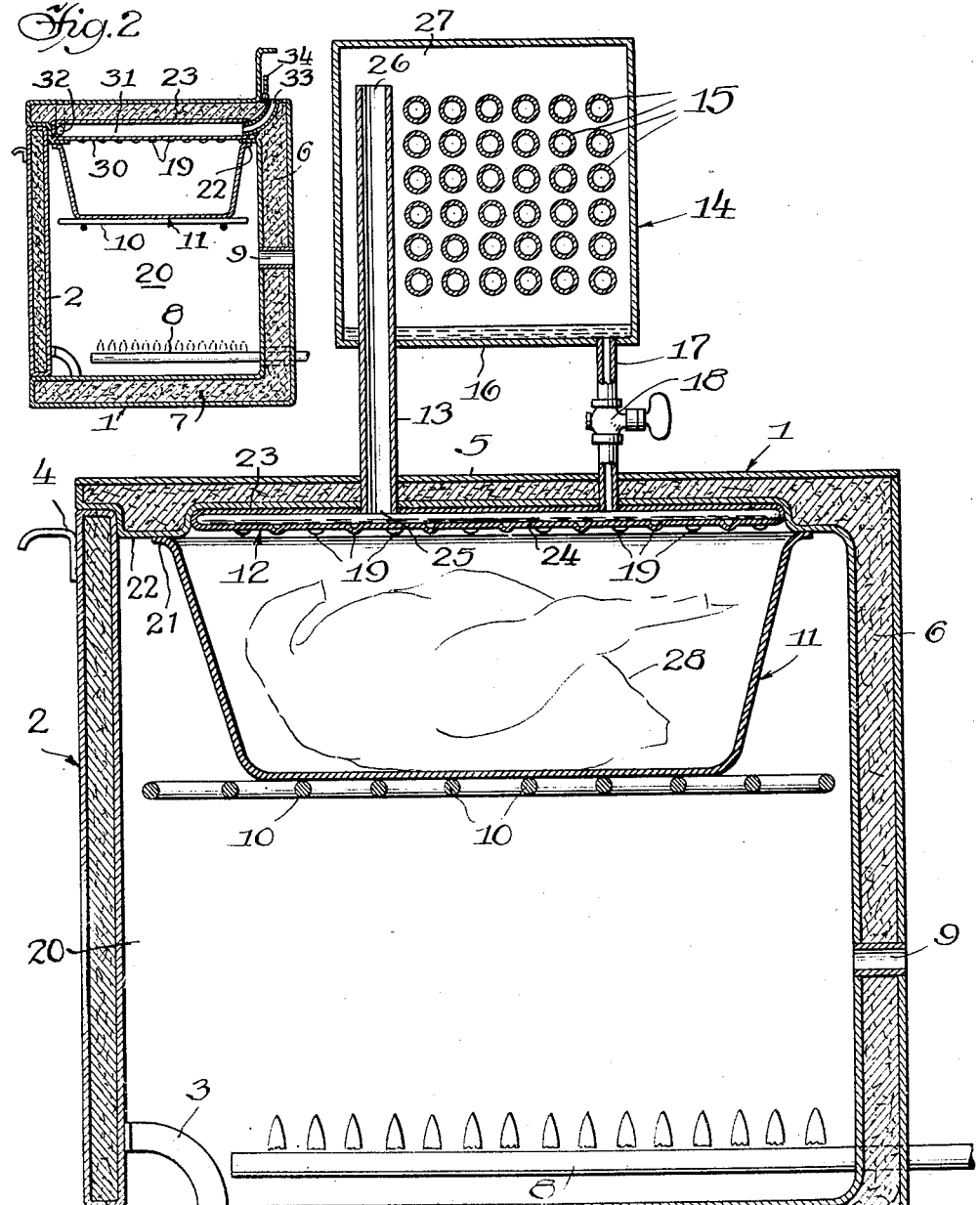
Figure 1 is a diagrammatic view in vertical cross-section through an oven of the type employed with gas or electric stoves or ranges, and equipped with the present novel invention.
Figure 2 is a reduced diagrammatic view similar to Fig. 1 showing a modified form of the present invention.

In the embodiment shown in the drawing and selected to illustrate the present invention, there is shown an oven I having a door or pivoted closure 2 hinged at 3 and provided with a handle 4 for opening and securing access to the interior of the oven. The top 5, rear 6, base 7, side walls 20 and the door or closure 2 are all suitably insulated for effectively retaining the heat from a burner or other suitable heating element 8. Although the heating unit is shown in the form of a gas burner, an electric element or other source of heat may be provided. The usual oven vent 9 is shown provided in the rear 6 of the oven.

Suitably mounted in the oven is a rack 10 for supporting thereon a relatively deep, open type roasting pan 11, having its upper edge 21 in close or relatively close contact with the underside 22 of the top 5 of the oven. Disposed directly above the pan and mounted in a recess 23 provided in the top of the oven is an evaporator or heat absorbing member 12 of a closed heat exchange device. This evaporator is in heat exchange relation to the interior of the oven and is insulated from the exterior thereof and is preferably, although not necessarily, of a size substantially conforming to the size and shape of the opening of the pan 11 whereby it is enclosed. Also it comprises a hollow and relatively flat receptacle and is adapted to be partially filled with a volatile heat transfer fluid 24 that evaporates at a temperature below the boiling point of water and condenses at a temperature substantially above room temperature. One such fluid is alcohol, although acetone or any low boiling point liquid may be employed. By varying the pressure in the heat exchange device any suitable fluid may be utilized as the heat exchange medium.

A vapor vent or conduit 13 is at its lower end 25 placed in communication with and leads from the evaporator 12 and its upper end 26 is disposed adjacent the upper portion 27 of a condenser 14 disposed above and outside the oven. As diagrammatically shown, the condenser 14 is provided with a series of cooling tubes 15 through which ambient air or other cooling fluid is circulated in any suitable manner to cool and condense the vapor flowing from the evaporator; however, any suitable heat exchange surface may be provided to condense the vapor. The condensed heat transfer fluid in the condenser falls to the bottom 16 thereof and is returned to the evaporator through a liquid line or conduit 17 for revaporization. A valve 18 is provided in the return line 17 for stopping or varying the operation of the heat exchange device when desired. In the event the valve 18 is closed, the heat exchange medium 24 will be vaporized in the evaporator 12, flow through the conduit 13 and be condensed and collected and retained in the lower portion 16 of the condenser 14 thereby terminating operation of the heat exchange device until such time as the operator again desires to make use of the self-basting feature by moving the valve to its open position.

In the operation of the heat exchange device, assuming that a roast 28 is in the pan 11 and the pan is positioned as shown in the drawing with its upper edge 21 seating against the underside 22 of the top of the oven enclosing the evaporator 12, the roast is heated through the pan 11 by means of the heating element 8 in the oven. As the roast continues to be heated, vapors evaporated or emanating from the roast rise and contact the underside or lower surface of the evaporator 12. With the valve 18 open to permit circulation and recycling of the volatile low boiling point heat transfer fluid such as alcohol and the evaporator partially filled therewith, the temperature of the evaporator cannot be above the boiling point of this fluid. As this temperature is below the boiling point of water and other volatilizable liquids in the roast and drippings, the vapors therefrom in contacting the lower surface of the relatively cool evaporator will give up their heat of vaporization to the heat transfer fluid and condense and collect thereon and subsequently fall back onto the roast to baste the same.

The heat absorbed by the heat transfer fluid 24 causes it to evaporate and pass upward through the vapor vent 13 and enter the upper portion 27 of the condenser 14. This condenser being positioned outside the oven and at ambient air temperature, causes the heat in the vapor to be dissipated into the air and the vapor to condense and collect in the bottom 16 of the condenser from where it flows through the liquid return line 17 for revaporization. The recycling of the heat transfer fluid continues so long as vapors rise from the roast or there is a temperature differential between the oven temperature and the vaporization temperature of the heat exchange fluid.

In order to facilitate and cause uniform return of the condensate to the roast, the lower surface of the evaporator 12 is preferably provided with suitably spaced drip points 19 which collect the condensate and drip it back onto the roast in the pan. As shown in the drawing, these drip points are preferably so disposed as not to interfere with the insertion or removal of the pan. As the oven pan 11 contacts or fits closely about the underside of the top of the oven and encloses the evaporator 12, substantially all of the vapors from the roast, and drippings in the pan, can reach the evaporator and only a minor portion escape around the edges of the pan and enter the oven from which they flow through the oven vent 9 to the ambient air. Likewise, substantially all of the fumes or oven gases are prevented from circulating about and directly contacting the evaporator whereby excessive loss of heat from the oven is in this manner eliminated.

While the evaporator 12 removes the heat of vaporization in the vapor evaporated from the roast, and drippings in the pan to effect self-basting of the roast, under normal operating conditions the evaporator absorbs an additional quantity of heat which is lost to the ambient air. This is due to the fact that the capacity of the evaporator for absorbing heat is or should be slightly greater than the heat of vaporization in the vapors emanating from the roast. Thus assuming the charge or quantity of heat exchange medium or fluid is constant and that a roast is being cooked at a relatively low temperature, the evaporator will absorb heat at a certain rate depending upon the temperature regardless of the quantity of vapors which contact it. Under these conditions the amount of heat absorbed by the evaporator is greater than is required for the condensation of the vapors; therefore, a certain percentage of heat supplied for cooking is lost through the evaporator to the ambient air. Now under conditions where the roasting operation is performed at a relatively high temperature, the quantity of vapors released is much higher and therefore the evaporator in absorbing a much larger quantity of the heat of vaporization of the liquid absorbs a smaller quantity of the heat supplied to the oven for roasting.

Accordingly, if desired, it is possible with the present invention to control the quantity or rate of flow of heat transfer fluid circulating in the heat transfer device by adjusting the valve 18. If, as mentioned above, the roasting operation is performed at a relatively low temperature and the valve 18 is adjusted so that the flow therethrough is restricted, the total rate of heat absorption in the evaporator 12 is reduced, so that a smaller quantity of heat is absorbed per unit of time. Thus the heat absorbed over that required to condense the vapors is reduced accordingly with a consequent increase in the heating efficiency of the oven. If the roasting temperature is high, then the valve 18 may be opened further or to its full open position to permit a greater amount of heat absorption.

By closing the valve 18, the self-basting feature may be eliminated for the reason that any heat transfer vapors that are discharged through the vent 13 will collect in the condenser and are prevented from returning for revaporization until the valve 18 is again opened. Thus when the valve is closed and all of the liquid has been vaporized in the evaporator, the heat transfer cycle is stopped and the evaporator 12 will then assume the temperature in the oven and is no longer capable of condensing vapors.

In Figure 2 there is disclosed a modified form of self-basting arrangement which differs from the preferred form in that the heat transfer medium or fluid is not recycled. Like parts in both embodiments are given like reference characters and the pan 11 is similarly mounted on the rack 10 and disposed adjacent the under surface 22 of the top 5 of the oven.

Disposed above the pan and mounted in the recess 23 is a heat absorbing or transfer member 30 in heat exchange relation with the interior and insulated from the exterior of the oven. This member should, though not necessarily, conform to the pan in order to provide a relatively large heat exchange surface and its interior is formed to provide a passageway 31 through which a cooling medium, such as air, flows to absorb heat therefrom. Connected to this absorber is an inlet duct or conduit 32 communicating with the outside ambient air for conducting relatively cool air thereto and an outlet duct or conduit 33 for conducting heated air from the absorber. Disposed in the outlet conduit 33 is a movable plate valve 34 which acts as a means for controlling the rate flow of cooling fluid therethrough.

In the operation of this heat exchange device for self-basting, assuming that the roast is in the pan and heat is applied thereto and that cooling fluid such as air is flowing or being circulated through the heat absorbing member to cool the same, as the vapors are evaporated from the roast, and drippings in the pan, they contact the underside of the member 30 and are cooled and condensed thereon and eventually drip back off of the drip points 19 to baste the roast from which they were evaporated. This basting operation will be continuous as long as the vapors are evaporated or until the operator closes the valve 34. When the valve 34 is closed and the circulation of air through the heat absorber is thereby stopped, it is obvious that the cooling effect of the air is terminated and the member will heat up to substantially the temperaure of the oven; also due to this, self-basting will not occur and heat losses therethrough are reduced to a minimum. Likewise it is possible to adjust the valve 34 to control the rate of flow of air through the absorber to vary the rate of heat absorption.

As previously mentioned, the heat discharged into the room in this manner is not excessive in that a greater portion of this heat represents the heat of vaporization of the liquid in the roast which would normally be released into the room even if this feature were not applied. Likewise it is possible to substitute water for the cooling fluid instead of air.

From the foregoing it can be seen that in this particular embodiment the condenser 14 is eliminated and there is no recirculation of cooling fluid, because in this instance the cooling fluid is taken from the room at one location and discharged back into the room at another. Any suitable means or location of ducts may be provided to effectively circulate air or other cooling fluid through the heat absorber.

From the foregoing, a heat exchange means has been described for removing the heat of vaporization of the vapors evaporated from a roast and drippings and for returning it thereto in such a manner as to provide a self-basting means. However, it is to be understood that the particular structure shown is subject to various modifications in that the particular shape, size, and location of the evaporator 12 and the condenser 14 may be formed and located in any number of ways or positions, as long as the condenser is positioned so that the condensed heat exchange fluid is returned to the evaporator for revaporization. Also it is possible to provide the above described apparatus without the specific type valve means 18 disclosed, as long as the means employed is capable of controlling the flow of the heat exchange fluid to the evaporator 12, such as for example, by providing a tiltable condenser. Any suitable means may be provided for supporting the pan in the oven and the particular means of sealing the pan may be accomplished in a number of different ways. Where it is desired in some instances, the condenser 14 may be eliminated and ambient air or other fluid may be circulated through the evaporator 12 to cool the same. In this case the heat exchange medium would not be recirculated.

From the above description and the disclosure in the drawings, it will be evident that the invention comprehends a novel self-basting device which when incorporated in an oven automatically and uniformly bastes a roast and results in a product that is more tender and juicier than one prepared in an oven devoid of this feature. The invention has the further advantage of reducing the amount of shrinkage of the roast.

Having thus disclosed my invention, I claim:

1. A self-basting device for use with conventional types of roasting ovens for stoves or ranges having a source of heat, comprising a pan for the roast supported in the oven above the source of heat with its upper edge closely adjacent the top of the oven whereby to confine the flow of heat to the bottom and sides of the pan, an evaporator located in the oven directly above the roast and within the confines of the upper edge of the pan for intercepting any vapors emanating from the roast, a volatile fluid in the evaporator for maintaining the temperature of the surface of the evaporator exposed to the vapors sufficiently low for condensing these vapors, and a condenser connected to the evaporator for receiving and condensing the volatile fluid from the evaporator and returning it thereto for recirculation.

2. In a roasting oven, a supporting rack, an open-type roasting pan supported upon the rack and having the upper edge disposed closely adjacent the underside of the top of the oven whereby to restrict the flow of heated air into the pan, and heat transfer means associated with the oven and including an evaporator disposed within the oven above the pan, a condenser disposed outside the oven and connected to the evaporator, and a heat transfer fluid in the evaporator adapted to volatilize at a temperature below the boiling point of water and to condense at or above room temperature, whereby vapors issuing from the roast and pan contact and collect on the evaporator and cause the heat transfer fluid to vaporize and pass into the condenser where this fluid is condensed and returned to the evaporator for revaporization, the vapors from the roast collecting on the evaporator being condensed and returned to the roast for self-basting.

3. In a self-basting device for a roast in an oven and including a roasting pan, means for supporting the pan with its upper edge disposed closely adjacent the top of the oven to restrict the flow of heated air into the pan, means for heating said oven, an evaporator located in said oven above said roast and pan for condensing vapors emanating therefrom and returning condensed vapors thereto for self-basting, a volatile fluid disposed in said evaporator for maintaining the temperature of said evaporator exposed to the vapors sufficiently low for condensing these vapors, a condenser remote from said oven connected to said evaporator for receiving and condensing the volatile fluid flowing from said evaporator, means for returning the condensed volatile fluid to said evaporator for revaporization, and means for placing said self-basting device into and out of operation at will.

4. A heat transfer device for an oven whereby a roast heated in the oven will be self-basted, comprising a pan for the roast supported in the oven with its upper edge disposed closely adjacent the underside of the top of the oven to restrict the entrance of heated air into the pan, a member disposed in the oven above the roast and closely adjacent the open end of the pan for contacting vapors evaporated therefrom, means including a heat exchange medium flowing in said member for cooling and condensing the vapors contacting said member and causing the condensate to drip back over the roast to self-baste the same, and means for controlling the flow of said heat exchange medium through said member.

5. In combination, a roasting oven provided with a source of heat, a pan for receiving a roast supported in the oven above the source of heat and with its upper edge disposed closely adjacent the top of the oven whereby to confine the flow of heat to the bottom and sides of the pan, a heat transfer device including an evaporator disposed above the roast and pan and containing a low boiling point heat transfer fluid adapted to evaporate at a temperature below the boiling point of water and condense at a temperature above room temperature, and a condenser disposed outside the oven and connected to the evaporator whereby vapors emanating from the roast contact and collect on the evaporator and cause the heat transfer fluid to vaporize and pass into the condenser where it is condensed and returned to the evaporator, the condensate of the vapors from the roast being returned thereto for basting.

6. In a device for self-basting a roast, an oven, an open-ended pan supported in the upper portion of the oven with its upper edge so disposed as to be closely adjacent the top of the oven, means below the pan for heating the oven and the roast, a heat absorbing device disposed in a recessed portion in the top of the oven directly above the roast and pan and adapted to condense vapors evaporated from said roast and return the condensed vapors thereto for self-basting, a remotely disposed heat dissipating device adapted to remove the heat absorbed by said heat absorbing device, and a heat transfer medium for transferring heat from said absorbing device to said dissipating device.

7. In a device for self-basting a roast, an oven, an open-ended pan for the roast supported in the oven and against the underside of the top of the oven to restrict the flow of heated air into the pan, means for heating the oven and the roast, a heat absorbing member disposed above the roast and adapted to condense vapors evaporated therefrom and returning the condensed vapors thereto for self-basting, a heat dissipating member remote from said oven and adapted to remove the heat absorbed by said heat absorbing member, a volatile heat transfer medium for transferring heat from said absorbing member to said dissipating member, and means for controlling the flow of the heat transfer medium to thereby vary the rate of heat transfer between said absorbing member and said dissipating member.

8. In a device for self-basting a roast, an oven, means for heating the oven, a pan supported in the oven above said heating means and with the upper edge of the pan in substantial sealing contact with the top of the oven whereby to confine the heat to the bottom and sides of the pan, a heat absorbing device disposed in the top of the oven above the roast and pan and adapted to condense vapors evaporated therefrom and returning the condensed vapors thereto for self-basting, a heat dissipating device disposed remote from said oven to remove the heat absorbed by said heat absorbing device, a heat transfer medium for transferring heat from said absorbing device to said dissipating device, and means for interrupting the flow of said heat transfer medium from said heat absorbing device to said heat dissipating device to terminate the operation of said self-basting device.

9. In an oven construction, a pan for receiving a roast, means for supporting the pan and roast in the oven with the upper open end of the pan disposed against the upper wall of the oven, means for supplying heat to the oven to heat said roast and means for self-basting the roast, said last mentioned means comprising an evaporator disposed above the pan and roast in the upper wall of the oven, a volatile heat transfer fluid contained in said evaporator adapted to evaporate and maintain said evaporator at a temperature below the vaporization temperature of vapors evaporated from said roast, a condenser disposed outside said oven and connected to said evaporator whereby vapors evaporated from the roast contact and collect on said evaporator and cause the heat transfer fluid to vaporize and pass into said condenser where it is condensed and returned to said evaporator, the condensate of the vapors from the roast being returned thereto for basting, and means for varying the rate of flow of said heat transfer fluid.

10. In a self-basting device for a roast in an oven, means for heating said oven, a pan supported in the oven above said heating means and with the upper edge of the pan in substantial sealing contact with the top of the oven whereby to confine the heat to the bottom and sides of the pan, an evaporator located in said oven above said pan and roast for condensing vapors evaporated therefrom and returning the condensed vapors thereto for self-basting, a volatile fluid in said evaporator for maintaining the temperature of said evaporator sufficiently low for condensing these vapors, a condenser remote from said oven and connected to said evaporator for receiving and condensing said volatile fluid flowing from said evaporator, means for returning the condensed volatile fluid to said evaporator for revaporization, and means for controlling the rate of flow of said volatile fluid through said device to vary the rate of heat transfer.

THOMAS R. SMITH.

REFERENCES CITED

The following references are of record in the file of this patent:

UNITED STATES PATENTS

| Number | Name | Date |
|---|---|---|
| 363,813 | Drumheller | May 31, 1887 |
| 1,380,656 | Lauth | June 7, 1921 |
| 1,434,792 | Neitro | Nov. 7, 1922 |
| 1,789,349 | Ballman | Jan. 20, 1931 |
| 2,010,431 | Huke | Aug. 6, 1935 |
| 2,083,611 | Marshall | June 15, 1937 |

FOREIGN PATENTS

| Number | Country | Date |
|---|---|---|
| 10,593 | Great Britain | 1885 |
| 245,021 | Italy | Feb. 17, 1926 |
| 472,246 | France | July 30, 1914 |